(12) United States Patent
Morend et al.

(10) Patent No.: US 12,458,053 B2
(45) Date of Patent: Nov. 4, 2025

(54) SYSTEM FOR ROASTING COFFEE BEANS

(71) Applicant: SOCIETE DES PRODUITS NESTLE S.A., Vevey (CH)

(72) Inventors: Joel Morend, Chatonnaye (CH); Stefano Ceccaroli, Chavornay (CH); Flavien Florent Dubief, Champagne (CH); Thomas Degreef, Grimbergen (BE); Ben Van Dyck, Brecht (BE); Rien Denise M. Lemmens, Boechout (BE); Michiel Alexander Celis, Ghent (BE); Christophe Van Bavinchove, Sint-Martens-Latem (BE)

(73) Assignee: Societe des Produits Nestle S.A., Vevey (CH)

( * ) Notice: Subject to any disclaimer, the term of this patent is extended or adjusted under 35 U.S.C. 154(b) by 953 days.

(21) Appl. No.: 17/596,843

(22) PCT Filed: Jun. 19, 2020

(86) PCT No.: PCT/EP2020/067201
§ 371 (c)(1),
(2) Date: Dec. 20, 2021

(87) PCT Pub. No.: WO2020/254635
PCT Pub. Date: Dec. 24, 2020

(65) Prior Publication Data
US 2022/0304361 A1    Sep. 29, 2022

(30) Foreign Application Priority Data

Jun. 20, 2019  (EP) .................................... 19181452
Dec. 13, 2019  (EP) .................................... 19216237

(51) Int. Cl.
*A23N 12/12* (2006.01)
*B01D 46/00* (2022.01)
(Continued)

(52) U.S. Cl.
CPC ....... *A23N 12/125* (2013.01); *B01D 46/0032* (2013.01); *B01D 46/448* (2013.01);
(Continued)

(58) Field of Classification Search
CPC .............................................. A23N 12/08–125
See application file for complete search history.

(56) References Cited

U.S. PATENT DOCUMENTS 4,012,208 A * 3/1977 Arnim ...................... F23J 15/00
96/280
4,177,952 A * 12/1979 Rikker ...................... B22C 5/10
241/40

(Continued)

FOREIGN PATENT DOCUMENTS

CN    102551179 A    7/2012
CN    108882746 A    11/2018
(Continued)

OTHER PUBLICATIONS

Chinese Office Action for Chinese Appl No. 202080042507.7 dated Mar. 6, 2023.
(Continued)

*Primary Examiner* — Sean M Michalski
(74) *Attorney, Agent, or Firm* — K&L Gates LLP

(57) ABSTRACT

The invention concerns a system for roasting coffee beans comprising: —a roasting apparatus (1), said apparatus producing smoke, and—a smoke treating unit (2) configured to collect and treat smoke produced by the roasting apparatus, wherein: —the roasting apparatus comprises a smoke outlet (11), and—the smoke treating unit comprises: a smoke inlet (21) configured to cooperate with the smoke outlet of the roasting apparatus, a smoke filtering sub-unit (22) comprising at least an active carbon filter (221), a smoke driver (23) configured to circulate smoke through the smoke treating (Continued)

unit from the smoke collecting device to an outlet (25) of the smoke treating unit, wherein the smoke treating unit (2) comprises an air inlet (24) configured to mix the smoke produced by the roasting apparatus (1) with ambient air before the smoke is circulated through the smoke filtering sub-unit (22).

19 Claims, 7 Drawing Sheets

(51) Int. Cl.
  *B01D 46/44* (2006.01)
  *B01D 53/02* (2006.01)
(52) U.S. Cl.
  CPC ........ *B01D 53/02* (2013.01); *B01D 2253/102* (2013.01); *B01D 2257/708* (2013.01)

(56) References Cited

U.S. PATENT DOCUMENTS

| | | | | |
|---|---|---|---|---|
| 4,368,710 A * | 1/1983 | Krieger | F02M 37/0029 | 123/505 |
| 4,541,409 A * | 9/1985 | Karst | F24C 15/2028 | 55/DIG. 36 |
| 4,655,194 A * | 4/1987 | Wooden | F24C 15/20 | 55/DIG. 36 |
| 4,944,285 A * | 7/1990 | Glassman | F24C 15/20 | 126/299 D |
| 5,163,786 A * | 11/1992 | Christianson | B65G 53/60 | 55/467 |
| 5,413,254 A * | 5/1995 | Decker | B65G 65/44 | 222/200 |
| 5,443,625 A * | 8/1995 | Schaffhausen | F24F 8/97 | 55/472 |
| 5,513,558 A * | 5/1996 | Erickson | A47J 37/015 | 219/400 |
| 5,660,103 A * | 8/1997 | Koopman | F24C 15/327 | 99/476 |
| 5,943,790 A * | 8/1999 | Gell, Jr. | A23N 12/12 | 426/466 |
| 5,958,494 A * | 9/1999 | Tidland | A23N 12/083 | 426/523 |
| 6,260,479 B1 * | 7/2001 | Friedrich | A23N 12/08 | 34/594 |
| 6,511,531 B1 * | 1/2003 | Cartellone | A61L 9/122 | 261/DIG. 89 |
| 7,875,833 B2 * | 1/2011 | Song | A23N 12/10 | 34/68 |
| 8,679,561 B2 * | 3/2014 | Ludwig | A47J 42/52 | 426/523 |
| 9,301,543 B2 * | 4/2016 | Ludwig | A23N 12/08 | |
| 10,021,903 B2 * | 7/2018 | Krutin | F26B 3/08 | |
| 10,959,575 B2 * | 3/2021 | Mccullough | A47J 42/50 | |
| 12,102,263 B2 * | 10/2024 | Behm | A23N 12/10 | |
| 2004/0074400 A1 * | 4/2004 | Song | A23N 12/10 | 99/483 |
| 2004/0105922 A1 * | 6/2004 | Moon | A23N 12/08 | 426/466 |
| 2005/0072018 A1 * | 4/2005 | Behm | A23N 12/10 | 219/400 |
| 2006/0051266 A1 | 3/2006 | Green et al. | | |
| 2008/0089986 A1 * | 4/2008 | Song | A23N 12/10 | 426/466 |
| 2009/0235819 A1 * | 9/2009 | Brookman | B01D 47/021 | 95/185 |
| 2011/0081467 A1 * | 4/2011 | Kando | A23N 12/08 | 99/355 |
| 2013/0344207 A1 * | 12/2013 | Ludwig | A23N 12/10 | 426/233 |
| 2014/0150673 A1 * | 6/2014 | Ludwig | A23F 5/046 | 99/447 |
| 2014/0314923 A1 * | 10/2014 | Sewell | A23N 12/08 | 426/233 |
| 2016/0016181 A1 * | 1/2016 | Lathrop | A23G 1/06 | 96/61 |
| 2018/0295870 A1 * | 10/2018 | Lopez | A23N 12/10 | |
| 2019/0133377 A1 * | 5/2019 | Mccullough | A23N 12/08 | |
| 2019/0208798 A1 * | 7/2019 | Voges | A23F 5/04 | |
| 2023/0355033 A1 * | 11/2023 | Corso | A47J 37/0713 | |
| 2024/0065307 A1 * | 2/2024 | Morend | B01D 46/10 | |
| 2024/0268435 A1 * | 8/2024 | Kim | A23N 12/08 | |

FOREIGN PATENT DOCUMENTS

| | | |
|---|---|---|
| JP | S6030641 A | 2/1985 |
| JP | H1156321 A | 3/1999 |
| JP | H1175796 A | 3/1999 |
| JP | 2001522593 A | 11/2001 |
| JP | 2009030850 A | 2/2009 |
| JP | 2009148606 A | 7/2009 |
| JP | 2016529888 A | 9/2016 |
| RU | 2009123097 A | 2/2011 |
| WO | 9831974 | 7/1998 |
| WO | 03031893 | 4/2003 |
| WO | 2006101511 A1 | 9/2006 |

OTHER PUBLICATIONS

Russian Office Action for Appl No. 2022100587/10 dated Feb. 8, 2024.

Japanese Office Action for Appl No. 2021-572511 dated Sep. 3, 2024, 4 pages.

* cited by examiner

SYSTEM FOR ROASTING COFFEE BEANS

CROSS REFERENCE TO RELATED APPLICATIONS

The present application is a National Stage of International Application No. PCT/EP2020/067201, filed on Jun. 19, 2020. which claims priority to European Patent Application No. 19181452.4, filed on Jun. 20, 2019 and European Patent Application No. 19216237.8, filed on Dec. 13, 2019, the entire contents of which are being incorporated herein by reference.

FIELD OF THE INVENTION

The present invention relates to apparatuses for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired components all together, in particular the usual roasted coffee aroma, but also undesired less safe volatile organic compounds (VOC) VOC such as pyridine, 2-furane methanol, caffeine furfural, formaldehyde, acetaldehyde, . . . and particulate matter (PM2.5, PM10), . . . .

When roasting is implemented in manufacturing places producing important quantities of roasted beans, generally all the conditions for catching unsafe components are supplied.

But, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to stop the emission of smoke from the roaster to avoid any healthy issue for people present in the shop. The existing solutions consist in filtering, using catalytic converter and/or electrostatic precipitator to catch or destroy the components of the smoke.

Depending on the type of solution used for treating smoke, the high temperature of the smoke can have deleterious effect on the smoke treating device. In particular, a filter made of active carbon is frequently positioned in the filter module. This type of filter can be damaged or cannot operate correctly if it is crossed by a smoke presenting a temperature above a certain temperature.

On the contrary, the high temperature of the smoke can be required if the filtering solution is a catalytic converter that is operated at a temperature above 300° C.

In the existing solutions, a fan is frequently used to drive the smoke to the filter solution and this fan can create much noise which is not desirable in a public area like a shop or a restaurant.

An object of the invention is to address the problem of controlling the temperature of the smoke dispensed by the roaster of coffee beans once it is treated by the filtering solution.

An object of the invention is to address the problem of protecting a filter like an active carbon from the heat of the smoke dispensed by the roaster of coffee beans.

Another object is to provide a solution that does not produce too much noise.

SUMMARY OF THE INVENTION

In a first aspect of the invention, there is provided a system for roasting coffee beans comprising:
a roasting apparatus, said apparatus producing smoke, and
a smoke treating unit configured to collect and treat smoke produced by the roasting apparatus,
wherein:
the roasting apparatus comprises a smoke outlet, and
the smoke treating unit comprises:
a smoke inlet configured to collect smoke,
a smoke filtering sub-unit,
a smoke driver configured to circulate smoke through the smoke treating unit from the smoke collecting device to an outlet of the smoke treating unit,
wherein the system comprises an air inlet device configured to mix the smoke produced by the roasting apparatus with ambient air in order to control the temperature of the smoke inside the smoke filtering sub-unit.

The system relates to the roasting of coffee beans by means of two apparatuses: first, the roasting apparatus in which beans are heated to be roasted and, secondly, the smoke treating unit configured to treat the smoke generated inside the first roasting apparatus during the roasting of the coffee beans.

The two apparatuses can be sub-parts of one single main system or alternatively, the two apparatuses can be conceived as separated modules cooperating together during the process of roasting.

Any type of roasting apparatus can be used. In the roasting apparatus, coffee beans are heated and preferably mixed to homogenise heating through the beans.

The source of heating can be a burner (meaning combustion) fed by natural gas, liquefied petroleum gas (LPG) or even wood. Alternatively the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans during the roasting operation can be obtained with a fluidic bed of hot air or mechanically with stirring blades or a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The roasting apparatus comprises an outlet from which smoke produced during the roasting operation can be evacuated.

The smoke treating unit of the system comprises a smoke inlet configured to cooperate with this smoke outlet of the roasting apparatus and to collect smoke through this smoke inlet.

The smoke treating unit of the system comprises a smoke filtering sub-unit. This sub-unit treat the smoke in order to reduce or eliminate harmful contaminants the smoke contains.

This sub-unit can comprise:
- an active treating unit that destroys contaminants inside the apparatus, such as an afterburner enabling thermal oxidation of contaminants or a catalytic afterburner, or
- a passive treating unit that retains contaminants inside the apparatus like mechanical filters (metallic sieves or paper filter), an active carbon filter or an electrostatic precipitator, or
- a unit that diverts contaminants away from the room (such as a duct connected to the outside of the room),
- or a combination of the above units.

An afterburner thermally oxidises the contaminants like CO and $CO_2$ at very high temperatures, generally above 700° C., and converts them into ashes.

A catalytic afterburner comprises a ceramic substrate coated with a catalytic impregnating agent containing noble metals, such as nanoparticles of copper oxide, nanoparticles of iron oxide, and typically one or more metals of the platinum group (platinum, palladium, rhodium). The operation of the catalytic afterburner requires a lower temperature than an afterburner: the temperature is generally comprised between 300° C. and 500° C. Conveniently, although not necessarily, before the smoke is passed into the catalytic converter, it is pre-heated, generally by means of a heat-exchanger fed with the smoke emerging from the catalytic converter.

Filters are usually able to retain volatile organic compounds (VOCs), hydrocarbons and particulate matters (PM). The smoke treating unit can comprise several filters depending on their ability to retain specific contaminants. Filters configured for trapping VOCs and hydrocarbons are preferably active carbon filter or charcoal filter. Filters configured for trapping particulate matters are preferably high efficiency particulate accumulator (HEPA) filters, metallic filters (for example ultrafine steel wool media filter). Electrostatic precipitators can be used to trap PM and VOCs.

In one preferred embodiment the smoke filtering sub-unit can comprise at least an active carbon filter. This type of filter adsorbs volatile organic compounds (VOC). This filter requires specific operating conditions in terms of temperature.

Usually this active carbon filter requires a temperature inferior to 65° C. Above such a temperature, the active carbon filter may produce VOC instead of retaining these compounds.

Preferably, this active carbon filter is operated at a temperature of at least 50° C. Below such a temperature, efficient filtering requires longer residence time of the smoke in the active carbon filter and managing low temperature and long residence time may be difficult to implement.

In this preferred embodiment, the smoke filtering sub-unit usually comprises at least one additional filter, said additional filter operating without heating. The at least one additional filter aims at retaining at least other types of contaminants than VOCs, such as:
- large particulate matter (PM) presenting size above 2.5 μm. This type of particulate matter can be captured by a HEPA filter (high efficiency particulate accumulator). This type of large particulate matter can be white plume smoke and small particles.
- chaff fines that can be trapped by ultrafine steel wool media filter or a metal mesh,
- small particulate matter (PM2.5). These particulates can be trapped by an electrostatic precipitator.

Preferably, the smoke filtering sub-unit comprises successively, according to the direction of the flow of the smoke inside the smoke treating unit, at least one filter to remove particulate matter and then an active carbon filter. This order prevents the active carbon filter from being plugged by particulate matter.

Preferably, if an electrostatic precipitator is implemented, it is positioned physically below the active carbon filter. As a result, when electrostatic precipitator is switched off, for example during cleaning and/or maintenance of the smoke treating unit, then particulates falling by gravity from the electrostatic precipitator do not fall on the active carbon filter.

According to one preferred embodiment, the smoke filtering sub-unit comprises successively: a HEPA filter, an electrostatic precipitator and then an active carbon filter according to the movement of the flow of the smoke inside the smoke treating unit.

Preferably within this embodiment, the active carbon filter is positioned physically above the electrostatic precipitator. Accordingly, the smoke is introduced upwardly through the successive devices.

The smoke is driven inside the smoke treating unit and the different filters by means of a smoke driver configured to circulate smoke through the smoke treating unit from the smoke collecting device to an outlet of the smoke treating unit. At the outlet, the smoke can be safely released inside the atmosphere of a room since the contaminants have been trapped.

The smoke driver is generally a fan driving the smoke to the outlet.

Preferably the fan is positioned next to the outlet of the smoke treating unit. As a result, the fan is not contaminated by the non-treated smoke and its maintenance is easier.

The smoke treating unit can comprise a VOC sensor and/or a PM sensor, preferably positioned after the active carbon filter. An alert can be provided if the level of VOC or PM bypasses a certain predetermined level.

The system comprises an air inlet device configured to mix the smoke produced by the roasting apparatus with ambient air in order to control the temperature of the smoke inside the smoke filtering sub-unit.

Ambient air can be taken directly from the room where the system is installed.

Usually this air inlet device is positioned at a position that is upstream the smoke filtering sub-unit, and if the smoke filtering sub-unit comprises an active carbon filter, upstream said active carbon filter.

Accordingly, before it is treated by the active carbon filter, the smoke is mixed with ambient air, that is air presenting a temperature inferior to 40° C., usually inferior to 25° C., with the effect that the temperature of the smoke collected from the smoke outlet is reduced. Temperature at the smoke outlet of the roasting apparatus usually reaches more than 65° C. but, further to mixing with ambient air, the temperature of the smoke is decreased in order to avoid malfunction of the active carbon filter inside the smoke filtering sub-unit.

The air inlet of the smoke treating unit can be designed to introduce a quantity of ambient air within the smoke in order to get a sufficient decrease of the temperature of the smoke at the active carbon filter. This design can partly determine the ratio of air volume to smoke volume to reach the desired temperature. This ratio can also be controlled by adjusting the power of the smoke driver as detailed below.

Preferably, the smoke treating unit comprises at least one temperature sensor configured for monitoring the temperature inside said unit. When the smoke treating unit comprises an active carbon filter, at least one temperature sensor is positioned in front of said active carbon filter. The temperature sensor enables the control of the temperature of the smoke close to this active carbon filter that requires operation in a specific range of temperature. The temperature sensor can be used to provide an alert if the temperature is outside the operation range.

In one embodiment, the air inlet device is positioned and designed to introduce air and smoke both at the same point inside the smoke treating unit. By introducing air and smoke simultaneously at one single point inside the smoke treating unit, the flows of these both gases are oriented similarly inside the smoke treating unit and the force required for driving them inside this unit is less important than if they were introduced within different directions at different points of the smoke treating unit.

In particular, when the smoke driver is a fan, usually positioned next to the outlet of the smoke treating unit, the speed of the fan can remain in a range that does not create too much noise around the smoke treating unit.

Preferably, the air inlet is designed to surround the smoke inlet. This design presents the advantage of preventing smoke from escaping inside the room at the connection between the roasting apparatus and the smoke treating unit.

Preferably, the air inlet device comprises:
 a first wall extending between the smoke outlet of the roasting apparatus and the smoke inlet of the smoke treating unit, and
 at least one hole through said wall.

The first wall enables the connection of the smoke outlet of the roasting apparatus with the smoke inlet of the smoke treating unit and guides the smoke in between the two apparatuses. At least one hole provides access to ambient atmosphere and enables the introduction of air inside the passage formed by the first wall. Usually the hole is an aperture pierced in a plain wall.

As a result, smoke is guided to the smoke treating unit and air is introduced and mixed with simultaneously.

Generally, the number and the size of the holes are set to provide a minimum ratio of air volume to smoke volume for the minimum speed of the smoke driver part of the system.

Usually a minimum ratio of air volume/smoke volume is about 1.

This minimum ratio usually guarantees that the connection between the smoke outlet of the roasting apparatus and the smoke inlet of the smoke treating unit is not too tight, which could impact the pressure inside the roasting apparatus during roasting operation and directly affect the roasting operation particularly if the roasting apparatus comprises an air driver to create a fluidic bed.

This minimum ratio of air volume to smoke volume can be increased by adapting the flow rate extracted by the smoke driver of the smoke treating unit (in particular the speed of the fan of the smoke driver), precisely by increasing this flow rate from a pre-determined minimum flow rate.

This ratio can be defined by taking into account the type of roasting apparatus (e.g. the roaster can generate an important volume of smoke, the design of the smoke outlet), the type of smoke treating unit (if this unit must be operated at low temperature, meaning high flow of air, or on the contrary at high temperature meaning small quantity of air).

In a particular embodiment, the first wall of the air inlet device can consist in at least two rods connecting the smoke outlet of the roasting apparatus to the smoke inlet of the smoke treating unit and the space extending between two next rods defining one hole.

In one embodiment of the air inlet device, the at least one hole can be covered by a mesh. The mesh is protective and prevents the introduction of small pieces like dust of big size, insects or fingers without limiting the introduction of ambient air.

In one embodiment, only one zone of the contour of the first wall of the air inlet device comprises at least one hole.

The position of the hole(s) in one particular zone of the contour of the first wall enables the introduction of ambient air form a particular area around the system in order to stabilize the flow of air entering the device. This configuration is particularly useful when the system is used in a place where ambient air flows around the system in an irregular manner due to frequent opening of a door, movement of customers, or in semi-opened shops and cafés. Providing a wall with a zone comprising all the holes and orienting this zone in the room where the movement of ambient air is the more stable avoids the introduction of an irregular flow of ambient air inside the smoke treating unit, which can affect the treatment of the smoked in the filtering sub-unit.

Preferably, the air inlet device comprises an external wall, said external wall surrounding at least a part of the first wall comprising said at least one hole, and said first wall and said external wall being separated by a gap.

This external wall surrounds at least the part of the first wall that comprises one or several holes. Accordingly, the position of this external wall provides a protection in front of the holes and stabilizes air before it enters through said holes.

In one preferred embodiment the external wall is a ring surrounding completely the first wall. With this preferred embodiment, if several holes are provided inside the first wall, they can be regularly positioned along the circumference of said first wall.

Alternatively, the external wall can present the shape of a crenel, each teeth of the crenel facing a hole in the first wall.

In one embodiment, the air inlet device comprises at least one size adjusting means to adjust the size of the at least one hole comprised in the first wall.

Accordingly, depending on the size of the hole(s), the flow rate of ambient air introduced inside the smoke inlet and its ratio to the smoke can be adjusted without the need to use another air inlet device in the system or without the need to adapt the flow rate extracted by the smoke driver of the smoke treating unit.

Alternatively, to provide a more flexible manner to control the quantity of air introduced inside the smoke treating unit, both the size adjusting means and the flow rate driven by the smoke driver (that is generally the speed of the fan of the smoke driver) can be modified.

If the air inlet device comprises several holes in its first wall, the size adjusting means can be configured to adapt simultaneously the sizes of all the holes of the air inlet device or one size adjusting means can be provided for each hole of the air inlet device.

Generally the size adjusting means enables the adjustment of the size of the at least one hole from fully opened to fully closed.

The fully closed position corresponds to a particular use of the system that normally does not correspond to the roasting operation of the roasting apparatus. Actually, as mentioned above, absence of opened hole(s) to introduce air could impact the pressure inside the roasting apparatus during roasting operation and directly affect the roasting operation, particularly if the roasting apparatus comprises an air driver to create a fluidic bed. Yet the fully closed position can be of interest during a cleaning operation of the system, in particular in a drying operation of the filtering sub-unit of the smoke treating unit as explained further below.

In one manual mode, the size adjusting means can be controlled manually by the operator of the system. This manual control can be set at the step of the configuration of the system, for example when a specific smoke treating unit is associated to a specific roasting apparatus. The operator is able to fix the size of the at least one hole to enable a specific ratio of air and smoke based on the specifications of the two apparatuses.

For example, during the roasting operation, the operator can desire to improve the performance of a smoke treating unit comprising an active carbon filter by avoiding a too high temperature and by introducing a high part of air in the mixture of smoke and air. This setting takes into account the temperature and the flow rate of the smoke produced by the specific roasting apparatus used in the system.

In another cleaning operation of the smoke treating unit, the operator can desire to introduce a high temperature flow of gas inside the smoke filtering unit, e.g. to dry some wet parts of the filtering sub-unit. In that mode, the highest temperature is desired and the at least one hole can be fully closed to take benefit of the hot gas produced by the roasting apparatus without mixing it with colder ambient air.

In one automatic mode, the system can comprise at least one actuating device to control the size adjusting means and the system comprises a control system operable to control said actuating device.

In that mode, the size adjusting means is moved by an actuating device, like a motor, controlled by the control system of the system.

If several holes are present, one size adjusting means and one actuating device can be configured to adjust the sizes of the holes simultaneously. In a more complex system, different size adjusting means can be provided, each of them or some of them being moved by different actuating devices. This implementation enables the customization of the air inlet device for different types of system (different roasting apparatuses and different smoke treating units), in different types of rooms (closure of the holes in one zone of the first wall of the air inlet device depending on the room as explained above) and for different modes (roasting, cleaning).

The control system controlling this actuating device can be the control system of the roasting apparatus or the control system of the smoke filtering unit.

In one preferred embodiment of the automatic mode, the smoke treating unit can comprise at least one temperature sensor configured for monitoring the temperature inside said unit, and the control system is arranged to control the at least one actuating device of the at least one size adjusting means based on at least the monitored temperature inside the smoke treating unit.

Based on a temperature set point, the temperature can be controlled inside the smoke treating unit by increasing the size of the at least one hole to decrease temperature inside the smoke treating unit and to decrease the size of the at least one hole to increase temperature inside the smoke treating unit.

This implementation can be particularly useful if the flow of smoke produced by the roasting apparatus is not constant.

In particular, during the operation of roasting coffee beans, the size of the at least one hole can be increased from the beginning to the end of the roasting operation in order to introduce less air at the beginning of the roasting operation and more air at the end of the roasting operation. Indeed, at the beginning of the roasting operation, the smoke generated by the roasting of the beans is less hot than at the end of the roasting operation. In addition, if the roasting operation happens in a system that has not been used for a certain time, the internal parts of this system, such as the parts upstream the filtering sub-unit, are cold and absorb heat of the smoke before said smoke reaches the filtering sub-unit. Accordingly, there is less need to introduce much ambient air in that smoke. On the contrary, at the end of the roasting operation, the smoke is particularly hot and it becomes necessary to introduce more ambient air inside the smoke treating unit.

Preferably, the above control system is arranged to control the actuating device and the smoke driver of the smoke treating unit based on at least the monitored temperature inside the smoke treating unit.

The power of the smoke driver can be adjusted to drive more or less air inside the smoke treating unit and respectively decrease or increase the temperature inside the smoke treating unit. This control consists essentially in adapting the flow rate of smoke inside the smoke treating unit, in particular by adapting the speed of the fan.

In one particular embodiment, the control system can be arranged to control the smoke driver of the smoke treating unit based at least on the size of the at least one hole of the air inlet device.

Actually, when the size of the at least one hole becomes particularly small, maintaining a certain level of sucking inside the smoke treating unit can create a modification of the pressure inside the roasting apparatus as mentioned above. Accordingly, during a roasting operation, under a pre-determined size of opening of the at least one hole, the power of the smoke driver can be automatically reduced respectively to avoid a too strong force of sucking on the smoke and a change of pressure in the roasting chamber.

The smoke driver can be controlled based on other factors than the sizes of the holes too, such as the noise generated by the fan.

When the system does not comprise size adjusting means and the size of the at least one hole is fixed, preferably, the smoke treating unit comprises at least one temperature sensor configured for monitoring the temperature inside said unit, and the control system is arranged to control the smoke driver of the smoke treating unit based on the measure of the temperature provided by the temperature sensor.

Usually the controller is adapted to control the temperature of the smoke at the position of an active carbon filter.

The air inlet device can be part of the roasting apparatus or part of the smoke treating unit or can be a separate device connectable to the roasting apparatus and to the smoke treating unit.

By part of, it is meant the air inlet device is conceived as a part of the apparatus.

The air inlet device can be fully integrated inside a roasting apparatus. In that case, the air inlet device can be designed to enable the introduction of a flow of air with a predefined minimum ratio with the smoke generated by said particular roasting apparatus.

Similarly, the air inlet device can be fully integrated inside a smoke treating unit. In that case, the air inlet device can be designed to enable the introduction of a flow of air with a predefined minimum ratio with a smoke in order to be treated efficiently by said smoke treating unit, in particular in view of the performance of the smoke driver and the optimal operation temperature of the filtering sub-unit.

In the last case, the air inlet device can be a separate device that can be used to upgrade a system of a roasting apparatus and a smoke treating unit.

In a second aspect there is provided a device for connecting the smoke outlet of a coffee beans roasting apparatus and the smoke inlet of a smoke treating unit configured to collect and treat smoke produced by the roasting apparatus, said device being configured to introduce and mix ambient air with the smoke produced by the roasting apparatus inside the smoke treating unit, wherein said device comprises:
- a first wall extending between the smoke outlet of the roasting apparatus and the smoke inlet of the smoke treating unit, and
- at least one hole through said wall.

Preferably this device comprises an interface configured to cooperate with the smoke outlet of a roasting apparatus and an interface to cooperate with the smoke inlet of a smoke treating unit.

In a third aspect there is provided coffee beans roasting apparatus comprising a smoke outlet, wherein said apparatus comprises an air inlet device connected to the smoke outlet, said device comprising:
- a first wall extending from and out of the smoke outlet of the roasting apparatus to, and
- at least one hole through said wall.

In one embodiment, the air inlet device can comprise an interface to cooperate with the smoke inlet of a smoke treating unit.

In a fourth aspect, there is provided a smoke treating unit configured to collect and treat smoke produced by a roasting apparatus, said smoke treating unit comprising:
- a smoke inlet configured to collect smoke, and
- a smoke filtering sub-unit, and
- a smoke driver configured to circulate smoke through the smoke treating unit from the smoke collecting device to an outlet of the smoke treating unit, wherein the smoke treating unit comprises an air inlet device configured to mix the smoke with ambient air before the smoke is circulated through the smoke filtering sub-unit.

In one embodiment, the air inlet device can be connected to the smoke inlet and said device can comprise:
- a first wall extending from and out of the smoke inlet, and
- at least one hole through said wall.

In one embodiment, the air inlet device can comprise an interface to cooperate with the smoke outlet of a roasting apparatus.

The smoke treating unit presents the same features mentioned in the first aspect except that it is a module independent from the roasting apparatus and connectable to different types of roasting apparatus.

In a fifth aspect, there is provided a method for roasting coffee beans and filtering the smoke produced during the roasting of said beans with a system such as described above, wherein the smoke driver of the smoke treating unit is controlled to adapt the quantity of ambient air within the smoke treating unit in order to control the temperature of the smoke inside the smoke filtering sub-unit.

The control usually consists in adjusting the power of the air flow driver or the speed of the fan of the air flow driver.

When the smoke treating unit comprises an active carbon filter, the smoke driver of the smoke treating unit can be controlled to introduce a quantity of ambient air within the smoke in order to get a temperature of the smoke at the active carbon filter of at most 65° C., preferably at least 50° C.

To reach temperatures below 50° C., a high ratio of volume of air to volume of smoke is needed, meaning a higher power of the smoke driver and a higher flow rate of the mixture of smoke and air, leading to a short time of contact of this mixture with the active carbon filter.

This short time may not be sufficient to eliminate all contaminants from the smoke. In addition, high power and flow rate induces more noise by the smoke driver which is not always desired when the system is installed in a room. For this reason, if there is no other manner to increase the quantity of air (in particular if the design of the air inlet is fixed), it is preferable to keep the temperature of the smoke above 50° C. at the active carbon filter.

In one embodiment, the control of the air flow driver, and accordingly the temperature in the smoke treating unit, during the roasting of the coffee beans in the roasting apparatus can be based on the monitoring of the temperature in the smoke treating unit.

In another embodiment, the control of the air flow driver, and accordingly the temperature in the smoke treating unit, during the roasting of the coffee beans in the roasting apparatus can be pre-determined based on the pre-determined roasting profile implemented in the roasting apparatus.

In a sixth aspect, there is provided a method for roasting coffee beans and filtering the smoke produced during the roasting of said beans with a system comprising an air inlet device with at least one size adjusting means to adjust the size of the at least one hole comprised in the first wall such as described above, said method comprising the step of adjusting the size of the at least one hole comprised in the first wall of the air inlet device in order to control the temperature inside the smoke filtering sub-unit.

Preferably, the size of the at least one hole is increased in order to decrease temperature inside the smoke treating unit or the size of the at least one hole is decreased in order to increase the temperature inside the smoke filtering sub-unit.

Additionally, the method can comprise the step of controlling the air driver in order to adjust the temperature inside the smoke treating unit.

In one embodiment, the adjustment of the size, and accordingly the temperature in the smoke treating unit, during the roasting of the coffee beans in the roasting apparatus can be based on the monitoring of the temperature in the smoke treating unit.

In another embodiment, the adjustment of the size and accordingly the temperature in the smoke treating unit, during the roasting of the coffee beans in the roasting apparatus can be pre-determined based on the pre-determined roasting profile implemented in the roasting apparatus.

In the present application, the term "filter" relates to any device able to remove a contaminant from a smoke by whatever physical process such as sieving, trapping, adsorbing, absorbing, electrostatic trapping.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

System for Roasting

Figure 1:
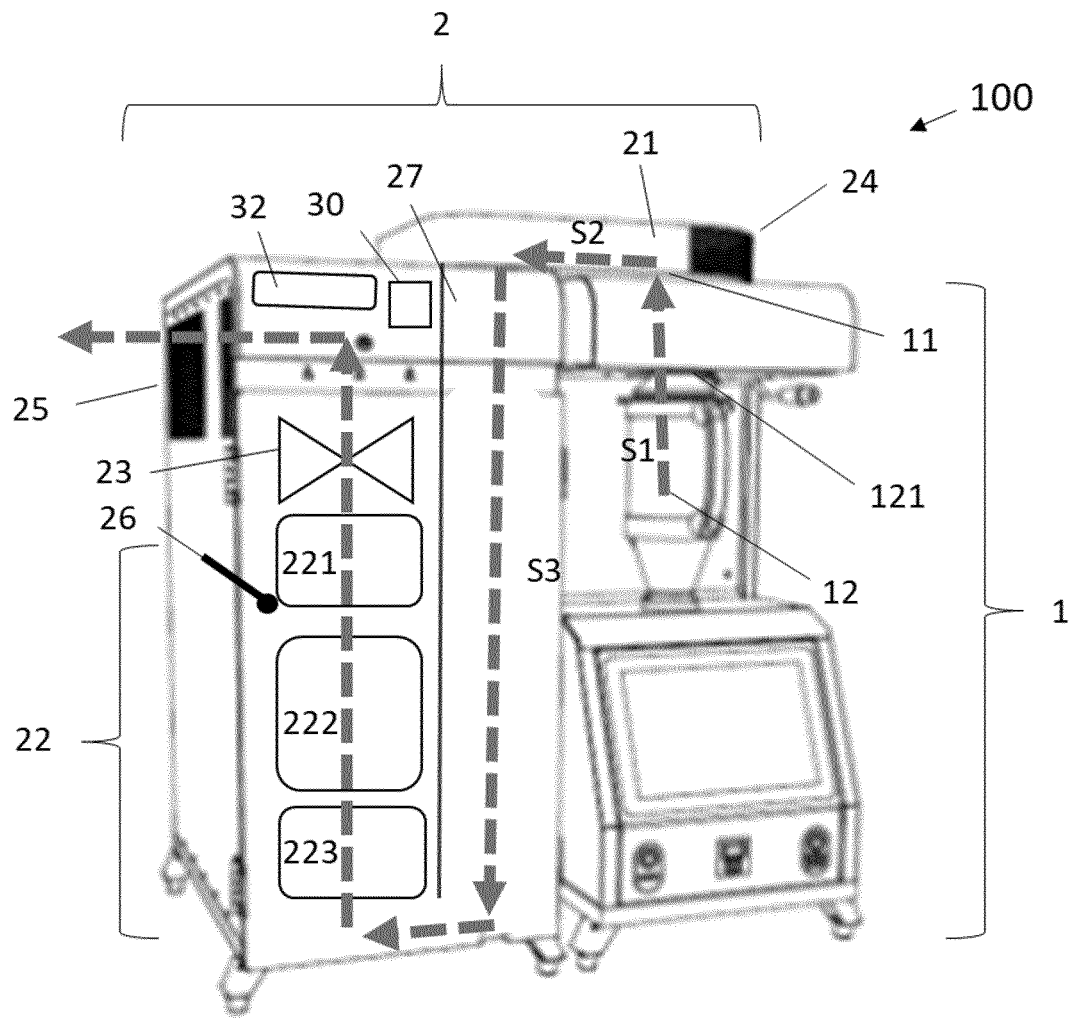
FIG. 1 is a view of a system according to the present invention illustrating the path of the smoke through the system.
Figure 2:
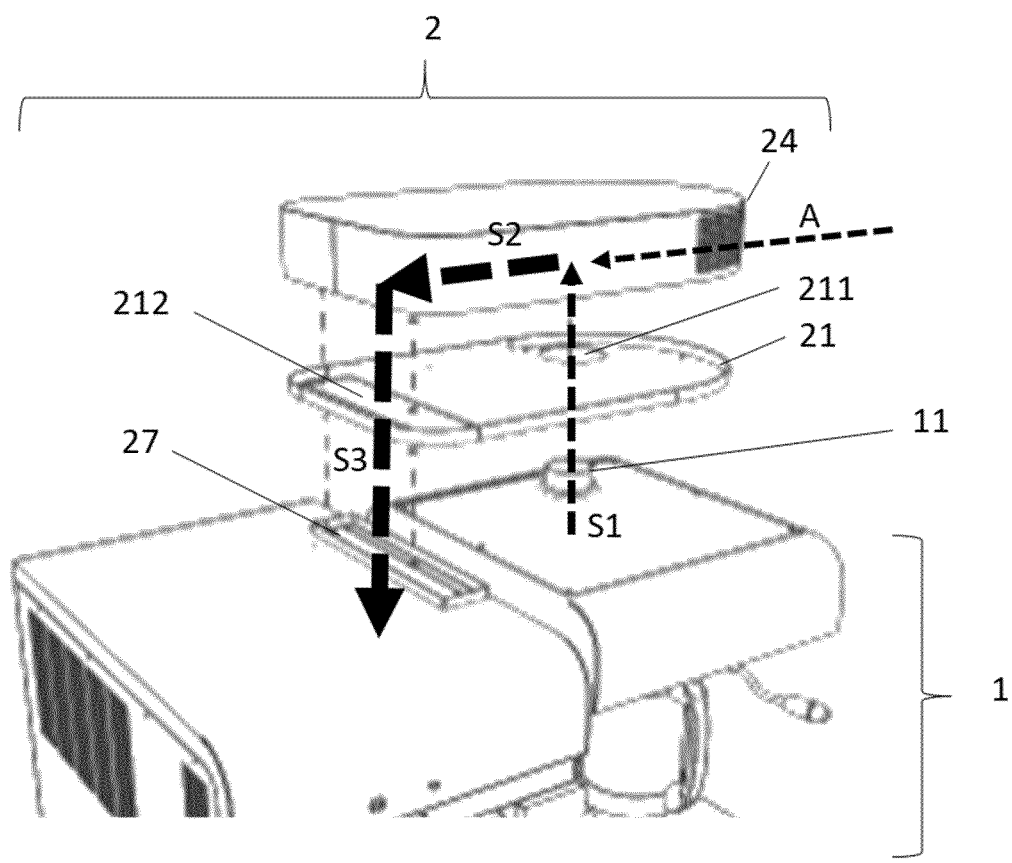
FIG. 2 is a detailed view of the collecting device and the air inlet of the system of FIG. 1.

FIGS. 1 and 2 show an illustrative view of a system of a roasting apparatus 1 and a smoke treating unit 2. Functionally, the roasting apparatus is operable to roast coffee beans and the smoke treating unit is operable to treat the smoke generated during roasting by the roasting apparatus.

Roasting Apparatus

The roasting apparatus 1 is operable to receive and roast coffee beans inside a roasting chamber 12.

Preferably, the roasting apparatus 1 comprises a roasting chamber 12 in which a flow of hot air is introduced to agitate and heat the beans. The hot air flow is usually produced by an air flow driver and a heater. These devices are positioned below the roasting chamber and introduce the flow of hot air through the bottom of the chamber. In the illustrated figure, the bottom of the chamber is configured to enable air to pass through, specifically it can be a perforated plate on which the beans can lie and through which air can flow upwardly.

The air flow driver is operable to generate a flow of air upwardly in direction of the bottom of the vessel. The generated flow is configured to heat the beans and to agitate and lift the beans. As a result, the beans are homogenously heated. Specifically, the air flow driver can be a fan powered by a motor. Air inlets can be provided inside the base of the housing in order to feed air inside the housing, the air flow driver blowing this air in direction of the chamber 12.

The heater is operable to heat the flow of air generated by the air flow driver. Preferably, the heater is an electrical resistance positioned between the fan and the perforated plate with the result that the flow of air is heated before it enters the chamber 12 to heat and to lift the beans.

The heater and/or the fan are operable to apply a roasting profile to the beans, this roasting profile being defined as a curve of temperature against time.

The roasting of the beans generates a smoke that is driven to the top opening 121 of the roasting chamber due to the flow of air generated by the air flow driver and as illustrated by arrow S1 in FIG. 1.

Generally a chaff collector is in flow communication with the top opening 121 of the chamber to receive chaffs that have progressively separated from the beans during roasting and due to their light density are blown off to the chaff collector.

The rest of the smoke is evacuated through the smoke outlet 11 at the top of the roasting apparatus.

Smoke Treating Unit

The smoke treating unit 2 is operable to receive and treat the smoke S1 emitted at the smoke outlet 11 of the roasting apparatus.

First, the smoke treating unit 2 comprises a smoke inlet 21 adapted to collect the smoke. This smoke inlet 21 is particularly illustrated in the exploded view of FIG. 2: the collecting device forms an internal void space guiding the smoke (dotted lines S1, S2, S3) from the outlet 11 of the roasting apparatus in direction of the smoke filtering sub-unit 22. In FIG. 2, it can be appreciated that the bottom part of the smoke collecting device comprises a hole 211 designed to cooperate in a loose manner with the smoke outlet 11 of the roasting apparatus, the hole 211 being quite larger than the cross section of the smoke outlet end of the roasting apparatus. Generally, the bottom part of the smoke collecting device is simply put above the top of the roasting unit without any fixing means. This is particularly practical when the roasting unit 1 and the smoke treating unit 2 are two separated module. The smoke treating unit 2 can be easily connected or disconnected from any roasting apparatus. This loose cooperation is not air tight and does not create a vacuum in the roasting apparatus which would impact the roasting operation, particularly if roasting happens in a fluidic bed.

Figure 11:
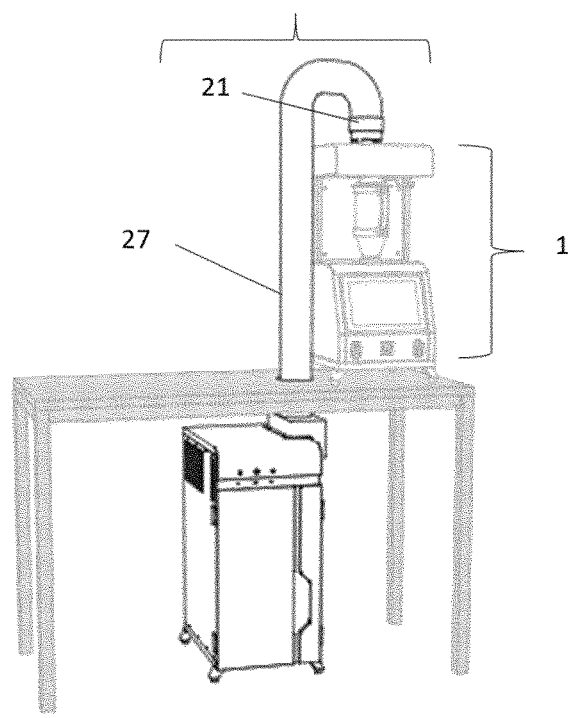
FIG. 11 shows an alternative position of the smoke treating unit relatively to the roasting apparatus.
Figure 12:
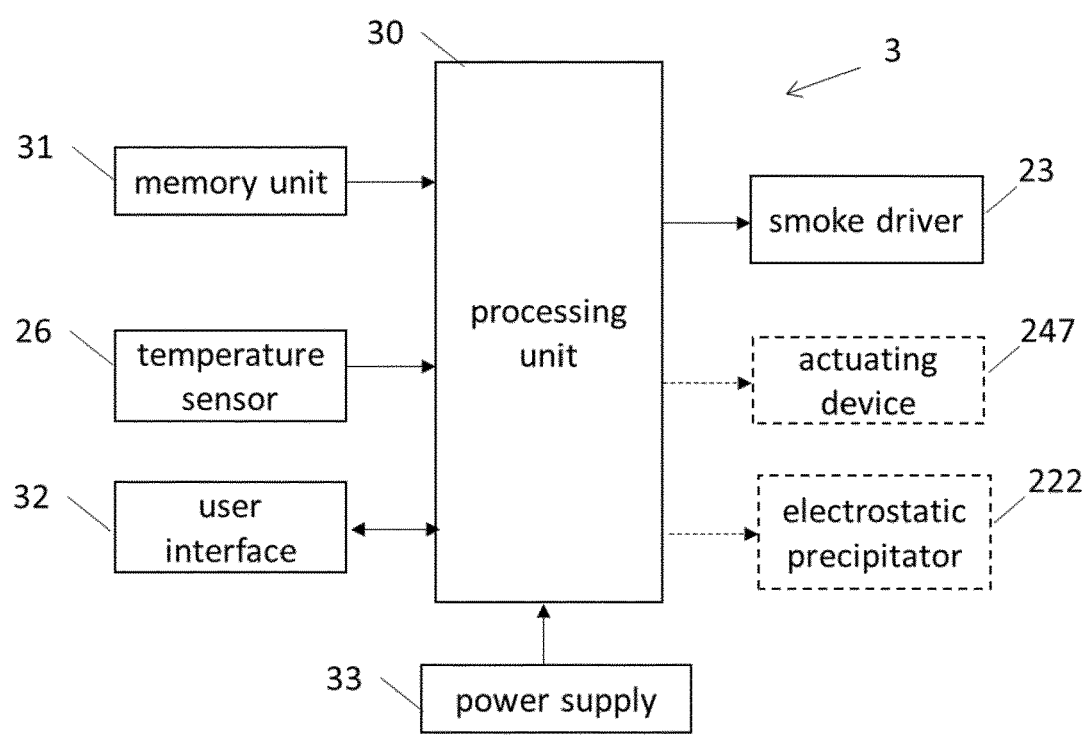
FIG. 12 is a block diagram of the controller of a system according to the invention.

The collecting device comprises a smoke outlet 212 cooperating with a guiding duct 27 conducting the smoke to the second part of the smoke treating unit that is the smoke filtering sub-unit 22. In the illustrated embodiment, the guiding duct 27 is designed to bring the smoke downwards in order to pass through the different filtering device from the bottom to the top. Yet, in other non-illustrated embodiments, the guiding duct can be designed to guide the smoke to pass through the different filtering devices from the top to the bottom. In the illustrated embodiment, the smoke filtering sub-unit 22 is positioned close and aside the roasting apparatus. In other embodiments as illustrated in FIG. 11, the smoke filtering sub-unit 22 can be positioned in a remote location, for example under the counter above which the roasting apparatus 1 is placed. In such embodiments, the shape of the guiding duct 27 is adapted to establish the connection between the different parts of the smoke treating unit.

The smoke filtering sub-unit 22 comprises an active carbon filter 221 adapted to remove VOCs from the smoke. In addition, in the particularly illustrated embodiment, the smoke filtering sub-unit 22 comprises filters for particulate matter such as a device 223 adapted for filtering large particulate matter PM10 (for example a HEPA filter) and a device 222 adapted for filtering small particulate matter PM2.5 (for example electrostatic precipitator). Preferably, the device for removing particulate matter are positioned upstream the active carbon filter. This upstream position guarantees that particulate matter do not foul the active carbon filter. Physically, the electrostatic precipitator is positioned below the active carbon filter to avoid that particulates fall from the electrostatic precipitator on the active carbon filter when the electrostatic precipitator is switched off.

Thirdly, the smoke filtering sub-unit 22 comprises a smoke driver 23, generally a fan, for sucking the contaminated smoke from the inlet 211 of the collecting device through the smoke filtering sub-unit 22, where it is treated, to the outlet 25 of the smoke filtering sub-unit 22, where it is dispensed in ambient atmosphere safely.

Lastly the smoke treating unit comprises an air inlet 24 along the passage defined for the smoke and upstream the smoke filtering sub-unit 22. In the illustrated embodiment, this air inlet 24 is positioned in the smoke inlet 21. This air inlet is a simple opening to ambient atmosphere eventually protected by a grid to avoid the entry of particulates. Due to the sucking function of the smoke driver 23, a flow A of ambient air is sucked and mixed with smoke S1 inside the smoke treating unit 22. As the temperature of ambient air is generally of at most 40° C., that is far inferior to the temperature of the smoke at the outlet of roasting apparatus, the temperature of the resulting gaseous mixture S2 is reduced. The air inlet is configured to enable a resulting temperature of the mixture S2 that enables the optimal treatment of the smoke by the active carbon filter 221, that is a temperature preferably comprised between 50 and 65° C.

The design of the air inlet can partly determine the ratio of air volume to smoke volume to reach the desired temperature. Based on the fixed design of the air inlet, the ratio of air volume to smoke volume can also be controlled by adjusting the power of the smoke driver that is the flow of air mixed with the smoke. Since the flow of smoke S1 is controlled by the roasting apparatus only, increasing or decreasing the power of the smoke driver impacts the volume of ambient air A introduced through the air inlet only.

The adjustment of the ratio by the power of the smoke driver is managed with the aim of controlling the temperature at the active carbon filter. In addition other secondary conditions can be taken into account such as:
- the noise created by the smoke driver at high flow rate. It has to be noticed that implementing the smoke driver at high power can create a noisy environment, which is not always desirable in a shop environment.
- the reduction of the contact time of the smoke with filters at high flow rate. Since high power of the smoke driver means high flow rate of the smoke through the smoke treating unit, this can lead to an insufficient contact time in the different filters, specifically within the active carbon filter 221 with the effect of dispensing contaminants in the atmosphere at the outlet 25 of the smoke treating unit.

Finally, the design of the air inlet 24 is preferably defined:
- to limit a pressure drop at the smoke outlet 11 of the roasting apparatus because it may impact the upstream process of roasting; this can be obtained by providing an air inlet sufficiently large, and
- to prevent smoke from flowing to the ambient atmosphere through this air inlet 24, which can happen if this air inlet is too large.

The air inlet 24 can be positioned downstream the smoke inlet 21 as long as it remains upstream the active carbon filter 221.

The effect of this controlled temperature of the smoke is the efficient treatment of the smoke by the active carbon filter, guaranteeing efficient adsorption of VOCs and avoiding emissions of VOCs by the active carbon filter itself at high temperatures, generally above 65° C.

Figure 3:
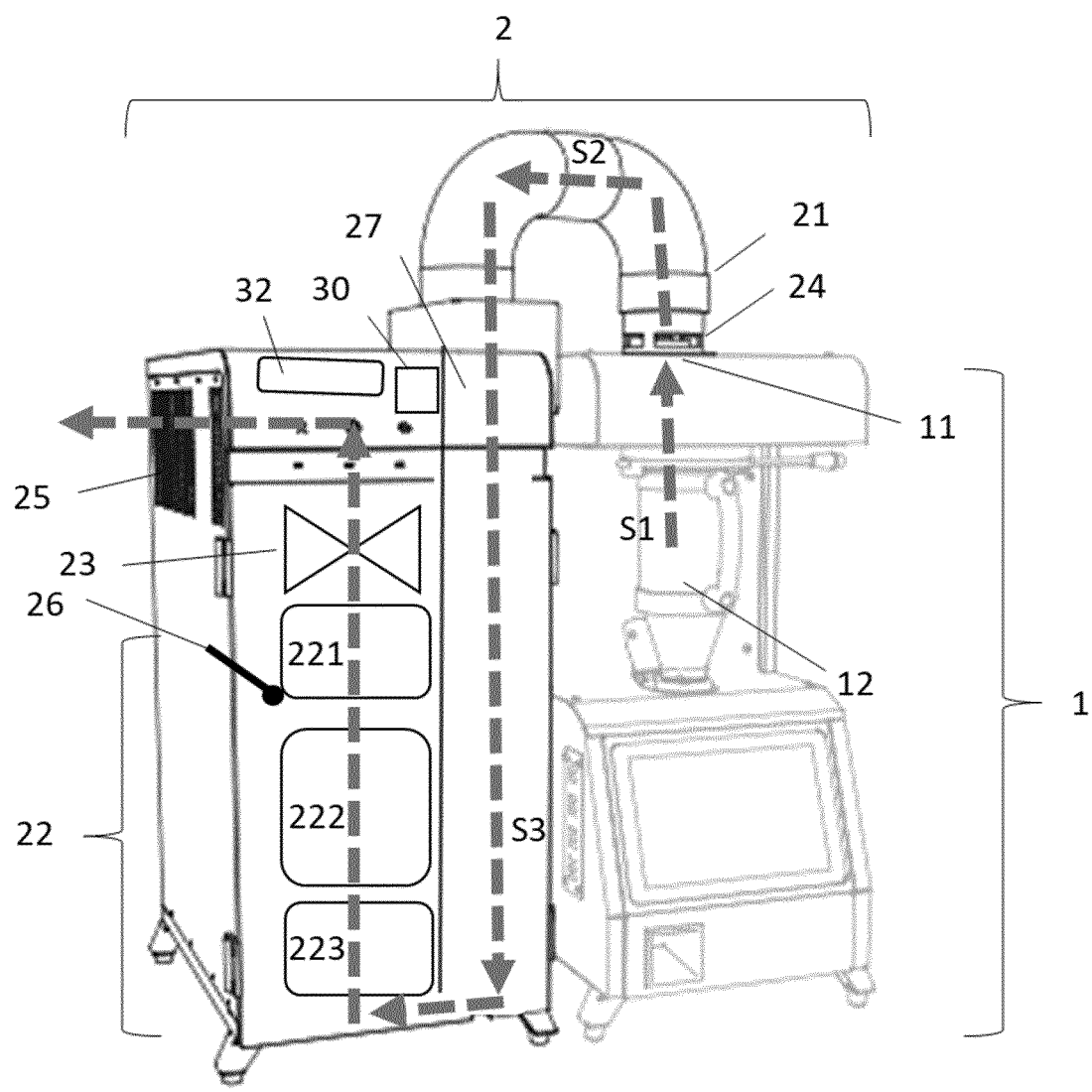
FIG. 3 is a view of another system according to the present invention illustrating the path of the smoke through the system.

FIG. 3 illustrates a variant of the system of FIGS. 1 and 2: this system comprises the same roasting apparatus 1 and a similar smoke treating unit 2 except that the smoke inlet 21 and the air inlet 24 are slightly different.

Figure 4:
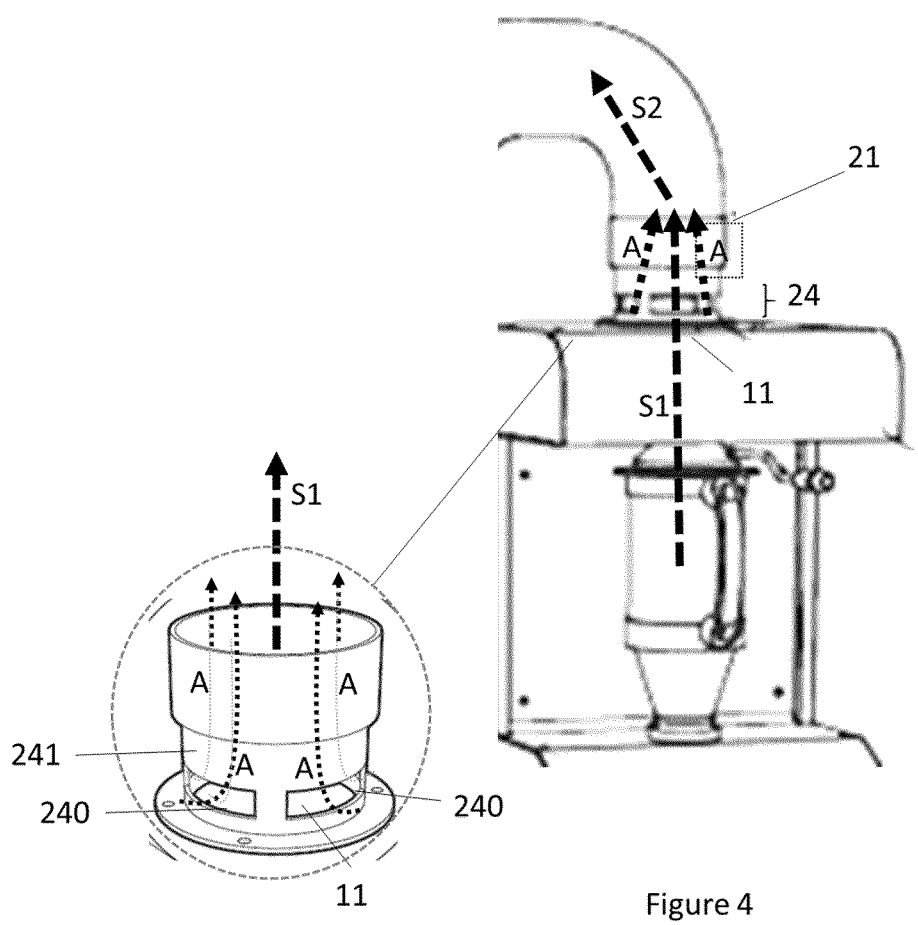
FIG. 4 is a detailed view of the collecting device and the air inlet of the system of FIG. 3, FIGS. 5 to 10 illustrate different embodiments of the air inlet device according to the invention.

In FIG. 4, it can be appreciated that at the interface between the smoke inlet 21 and the smoke outlet 11, an air inlet device 24 is provided. Due to the sucking function of the smoke driver 23, a flow A of ambient air is sucked and mixed with smoke S1 inside the smoke treating unit 22. This device 24 introduces ambient air (illustrated by arrows A) within the smoke S1 produced by the roasting apparatus and mixes this air and this smoke inside the smoke treating unit 2.

As can be noticed from FIG. 3, this air inlet device 24 is the single means enabling the introduction of air inside the smoke treating unit 2. No other air inlet or other device to introduce air is present in the smoke treating unit downstream that air inlet device positioned at the interface between the smoke outlet 12 of the roasting apparatus and the smoke inlet 11 of the smoke treating unit.

This smoke inlet 21 is particularly illustrated in FIG. 4: at the upper upstream side of the smoke treating unit, the smoke inlet 21 is formed of tube end. The tube guides the smoke (dotted lines S1, S2) from the outlet 11 of the roasting apparatus in direction of the smoke filtering sub-unit 22.

In the magnified view of the interface between the smoke treating unit and the roasting apparatus according to the illustrated embodiment of FIG. 4, the air inlet device 24 comprises a first wall 241 extending between the smoke outlet 11 and the smoke inlet 21 and connecting them. This first wall comprises several holes 240 (four holes in this specific embodiment though only two out of the four can be seen in the front view of FIG. 4) enabling the introduction of air as illustrated by the four arrows A.

Advantageously, these holes provide a loose connection of the smoke outlet 11 to the smoke treating unit simultaneously with the positive effect of limiting any pressure effect inside the roasting chamber.

These holes 240 surround the smoke inlet 21 along the circumference of the tube. As a result, these holes enable the introduction of air as illustrated along a vertical upside direction as illustrated by arrows A and similarly to the smoke S1. The fact of introducing the smoke and the air at the same point of the smoke treating unit provides flows of air and of smoke along the same direction (here vertically and upside) which requires less sucking by the smoke driver 23 and produces less noise. It can be noticed that the smoke treating unit 2 does not comprise any other air inlet than those illustrated upstream inlets 24.

In alternative embodiments, the air inlet can present more or less holes 240 including one hole only.

Preferably these holes 240 are protected by a fine grid or mesh to prevent any intrusion of items.

Figure 5:
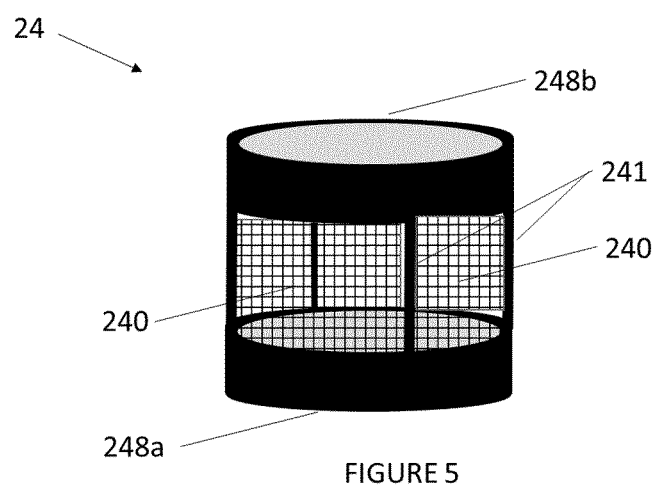

The size and the shape of these holes 240 can vary. FIG. 5 schematically illustrates an air inlet device 24 presenting four very large holes 240 wherein the first wall 241 is limited to four rods connecting the part 248a connectable to the smoke outlet of the roasting apparatus to the part 248b connectable to the smoke inlet of the smoke treating unit. Grids protect these large holes.

The design of the air inlets 24, in particular their number and the area defined by the holes, is preferably defined:
- to limit a pressure drop at the smoke outlet 11 of the roasting apparatus because it may impact the upstream process of roasting; this can be obtained by providing a global air inlet sufficiently large. In particular the design can be defined to provide a minimum ratio of air volume to smoke volume for the minimum speed of the smoke driver part of the system.

and
to prevent smoke S1 from flowing to the ambient atmosphere through these air inlets 24, which can happen if they are too large. The surrounding positions of the different inlets 24 can guarantee this effect in the illustrated embodiment.

Figure 6:
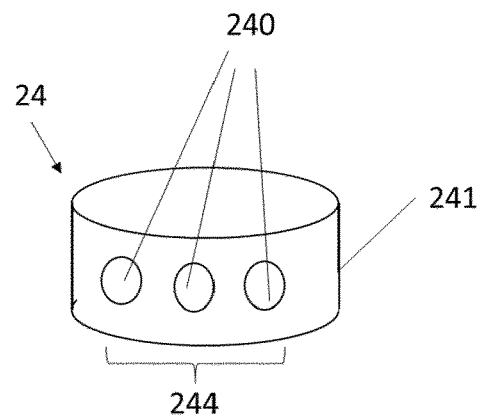

FIG. 6 illustrates a particular embodiment of the air inlet device 24 comprising three holes 240 in the front zone 244 of the contour of the first wall 241 only. No holes are provided in the other side and back zones of the first wall 241.

If the system is used in a part of the room that undergoes air turbulence due to movement of customers, door opening. The use of such an air heating device in the system enables the orientation of the holes 240 in a position where air is not or less subjected to turbulence.

Figure 7A:
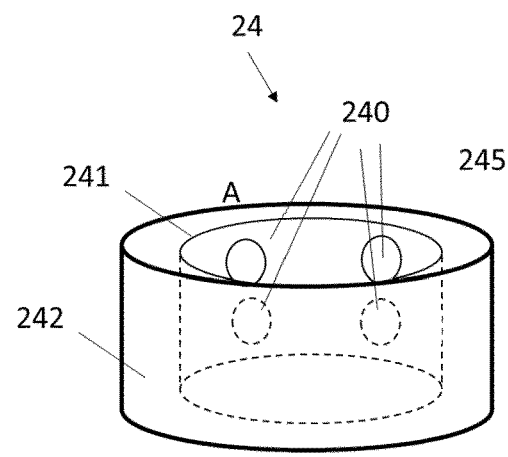

FIG. 7A illustrates a particular embodiment of the air inlet device 24 comprising four holes 240 in the first wall 241 and external ring wall 242 surrounding the first wall 241. The two walls 241, 242 are separated by a gap 245. Inside this gap, the air is protected from external turbulences and can be sucked through the holes 240 homogeneously inside the air inlet device and in the smoke inlet of the smoke treating unit.

In addition this external ring wall 242 prevents the introduction of items through the holes 240, prevents smoke from escaping from the holes (due to air stabilisation). This wall 242 also limits the noise of the air sucked through the air inlet device compared to an embodiment without this external ring wall.

Figure 7B:
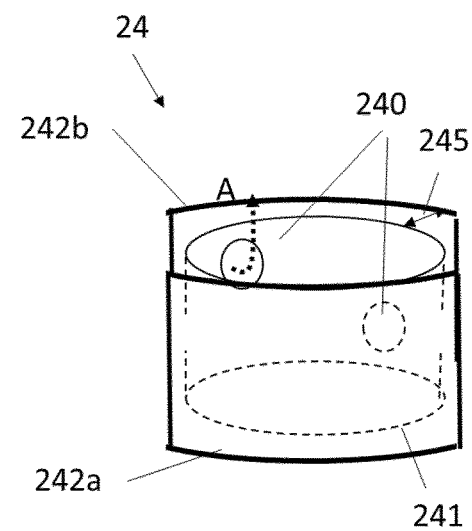

FIG. 7B is an alternative embodiment to FIG. 5A, where the external wall comprises two parts 242a, 242b, each of them surrounding the part of the first wall comprising a hole 240.

Figure 8:
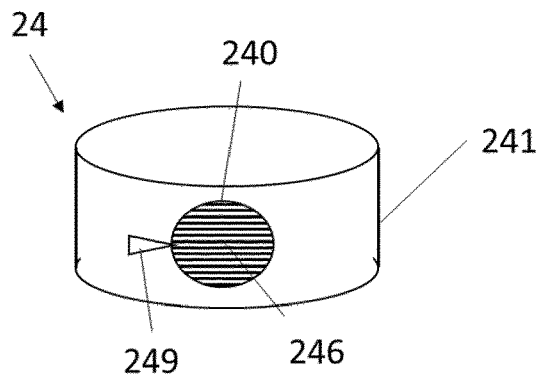

FIG. 8 illustrates a particular embodiment of the air inlet device 24 comprising one hole 240 in the first wall 241 and a size adjusting means 246 to adjust the size of said hole 240. In the this embodiment, the adjusting means consists in shutters that can be oriented between a first position where the hole is fully opened to a second position where the hole is fully closed and intermediate positions where the size of the hole can be adjusted. In this embodiment, the adjusting means 246 can be controlled by a manual actuator 249 such as a screw.

Figure 10:
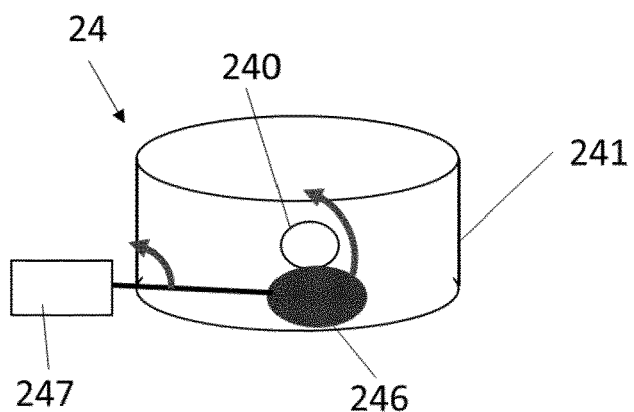

Other types of size adjusting means can be used like a cover sliding progressively by rotation or translation over the hole. FIG. 10 illustrates an embodiment where the size adjusting means is a cover 246 configured to slide partially or totally above the hole 240 according to a rotational movement.

If several holes are provided, preferably each of them is provided with respective size adjusting means. That provides the opportunity to close holes in one specific area 244 with the effect of protecting the introduction of air as mentioned above.

The different adjusting means can be controlled by the same common actuator but preferably are controlled separately by different actuators.

Figure 9:
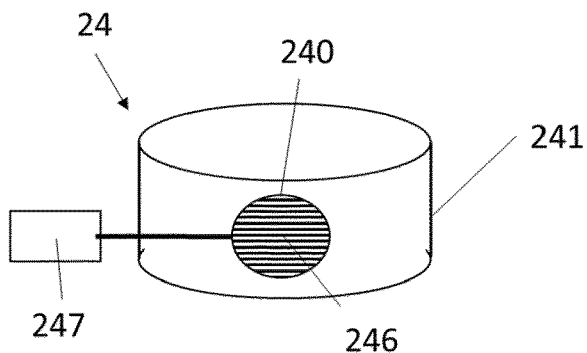

FIG. 9 illustrates an alternative to the embodiment of FIG. 6 where the manual actuator is replaced by an automated actuating device 247, like a motor, that can be controlled by the control system of the system.

As the temperature of ambient air is generally of at most 40° C., that is far inferior to the temperature of the smoke at the outlet of roasting apparatus, the fact of introducing and mixing air with the smoke leads to a decrease of temperature of the smoke S2 to be treated by the filtering sub-unit.

The air inlet device can be configured to enable the introduction of a flow of air resulting in a temperature of the mixture S2 that guarantees the optimal treatment of the smoke, for example, if the filtering sub-unit comprises an active carbon filter 21, that is optimally operated at a temperature comprised between 50 and 65° C.

The design of the air inlet can partly determine the ratio of air volume to smoke volume to reach the desired temperature. Based on the fixed design of the air inlet, the ratio of air volume to smoke volume can also be controlled by adjusting the power of the smoke driver that is the flow of air mixed with the smoke. Since the flow of smoke S1 is controlled by the roasting apparatus only, increasing or decreasing the power of the smoke driver impacts the volume of ambient air A introduced through the air inlet only.

The adjustment of the ratio by the power of the smoke driver is managed with the aim of controlling the temperature in the smoke treating unit. In addition other secondary conditions can be taken into account such as:
the noise created by the smoke driver at high flow rate. It has to be noticed that implementing the smoke driver at high power can create a noisy environment, which is not always desirable in a shop environment.
the reduction of the contact time of the smoke with filters at high flow rate. Since high power of the smoke driver means high flow rate of the smoke through the smoke treating unit, this can lead to an insufficient contact time in the different filters, specifically with the use of an active carbon filter 221 with the effect of dispensing contaminants in the atmosphere at the outlet 25 of the smoke treating unit.

The effect of this controlled temperature of the smoke is the efficient treatment of the smoke in particular by the active carbon filter, guaranteeing efficient adsorption of VOCs and avoiding emissions of VOCs by the active carbon filter itself at high temperatures, generally above 65° C.

When the air inlet device comprises an actuating device 247 to adjust the size of the hole(s), the flow of air and the ratio of air and smoke can be controlled by modifying the size of the hole(s) in place of or in addition to the adjustment of the power of the smoke driver. The adjustment of the size of the hole(s) can be done dynamically during the treatment of the smoke produced by the roasting apparatus based on the measure of the temperature inside the smoke treating unit: for example, the size can be reduced at the beginning of the roasting operation because the temperature of the smoke is not high due to the heating inertia for heating the internal parts of the smoke treating unit, and, after a certain time, the temperature having risen, the size of the holes can be increased to introduce more fresh air inside the smoke.

With reference to FIG. 3, 4, 12 and 9 or 10, the control system 3 will now be considered when the system comprises an actuating device 247 for the air inlet.

When the air inlet device 24 comprises automatic actuating device 247 for controlling size adjusting means of the holes 240, then alternatively or in addition to the control of the smoke driver 23, the processing unit 30 can be operable to:
receive an input of the temperature sensor 26,
process the input according to smoke treating program code (or programmed logic) stored on the memory unit 31,
provide an output, which comprises the control of the actuating device 247. Again the process is more preferably executed with closed-loop control using the input signal from the temperature sensor 26 as feedback.

If the temperature becomes too high, the size of the hole(s) 240 is increased to introduce a more important volume of ambient air A through the air inlet device 24 and to mix more air with the smoke S1 with the effect of decreasing the temperature of the flow of smoke S2.

But, if the temperature becomes too low, the size of the hole(s) 240 is decreased to introduce a less important volume of air ambient A and to mix less air with the smoke S1 with the effect of increasing the temperature of the smoke S2. In that situation, the processing unit can be operable to prevent the adjustment of the size of the hole(s) 240 under a minimum value to avoid impact on the pressure inside the roasting apparatus and to still reach the objective of limiting the introduction of air by controlling the smoke driver 23 and reducing the speed of the fan.

The advantage of controlling the temperature by adjusting the size of the hole(s) 240 compared to a solution controlling the speed of the smoke driver only is that it has no or less impact on the noise produced by the smoke driver.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 1
  smoke outlet 11
  roasting chamber 12
    top outlet 121
smoke treating unit 2
  smoke inlet 21
    hole 211
  smoke filtering sub-unit 22
    active carbon filter 221
    PM filter 222, 223
  smoke driver 23
  air inlet device 24
    hole 240
    first wall 241
    external wall 242, 242a, 242b
    mesh 243
    zone 244
    gap 245
    size adjusting means 246
    actuating device 247
    interface 248a, 248b
    manual actuator 249
  outlet 25
  temperature sensor 26
  guiding duct 27
control system 3
  processing unit 30
  memory unit 31
  user interface 32
  power supply 33
system 100

The invention claimed is:

1. A system for roasting coffee beans, the system comprising:
  a roasting apparatus, the roasting apparatus configured to produce smoke, and
  a smoke treating unit configured to collect and treat smoke produced by the roasting apparatus,
  wherein:
    the roasting apparatus comprises a smoke outlet, and
    the smoke treating unit comprises:
      a smoke inlet configured to collect smoke,
      a smoke filtering sub-unit, and
      a smoke driver configured to circulate smoke through the smoke treating unit from the smoke collecting device to an outlet of the smoke treating unit, and
  the system comprises an air inlet device configured to mix the smoke produced by the roasting apparatus with ambient air in order to control the temperature of the smoke inside the smoke filtering sub-unit, wherein the air inlet device is positioned at a position that is upstream the smoke filtering sub-unit,
  wherein the air inlet device comprises a wall extending between the smoke outlet and the smoke inlet, wherein the wall includes at least one hole.

2. The system according to claim 1 wherein the smoke filtering sub-unit comprises at least an active carbon filter.

3. The system according to claim 2, wherein the smoke filtering sub-unit comprises at least one additional filter, the additional filter operating without heating.

4. The system according to claim 2, wherein the smoke filtering sub-unit comprises successively: a HEPA filter, an electrostatic precipitator and an active carbon filter.

5. The system according to claim 1, wherein the air inlet device is positioned and designed to introduce air and smoke both at the same point inside the smoke treating unit.

6. The system according to claim 1, wherein the smoke treating unit comprises at least one temperature sensor configured for monitoring the temperature inside the unit.

7. The system according to claim 1, wherein the air inlet device comprises:
  a first wall extending between the smoke outlet of the roasting apparatus and the smoke inlet of the smoke treating unit, and
  at least one hole through the wall.

8. The system according to claim 1, wherein:
  the first wall of the air inlet device consists in at least two rods connecting the smoke outlet of the roasting apparatus to the smoke inlet of the smoke treating unit, and
  the space extending between the at least two rods defines one hole.

9. The system according to claim 6, wherein a zone of the first wall of the air inlet device comprises at least one hole.

10. The system according to claim 6, wherein the air inlet device comprises an external wall, the external wall surrounding at least a part of the first wall comprising the at least one hole, preferably surrounding completely the first wall, and the first wall and the external wall being separated by a gap.

11. The system according to claim 6, wherein the air inlet device comprises at least one size adjuster to adjust the size of the at least one hole comprised in the first wall.

12. The system according to claim 10, wherein the system comprises at least one actuating device to control the size adjuster and the system comprises a control system operable to control the actuating device.

13. The system according to claim 12, wherein the smoke treating unit comprises at least one temperature sensor configured for monitoring the temperature inside the unit, and wherein the control system is arranged to control the at least one actuating device of the at least one size adjuster based on at least the monitored temperature inside the smoke treating unit.

14. The system according to claim 12, wherein the control system is arranged to control the actuating device and the smoke driver of the smoke treating unit based on at least the monitored temperature inside the smoke treating unit.

15. The system according to claim 14, wherein the control system is arranged to control the smoke driver of the smoke treating unit based at least on the size of the at least one hole.

16. The system according to claim 7, wherein the size of the at least one hole is fixed and wherein the smoke treating unit comprises at least one temperature sensor configured for monitoring the temperature inside the smoke treating unit, and wherein the control system arranged to control the smoke driver of the smoke treating unit based on the measure of the temperature provided by the temperature sensor.

17. The system according to claim 1, wherein the air inlet device is part of the roasting apparatus or part of the smoke treating unit or is a separate device connectable to the roasting apparatus and to the smoke treating unit.

18. A device for connecting a smoke outlet of a coffee beans roasting apparatus and a smoke inlet of a smoke treating unit configured to collect and treat smoke produced by the roasting apparatus, the device being configured to introduce and mix ambient air with the smoke produced by the roasting apparatus inside the smoke treating unit, wherein the device comprises:
 a first wall extending between the smoke outlet of the roasting apparatus and the smoke inlet of the smoke treating unit, and
 at least one hole through the wall.

19. A coffee beans roasting apparatus comprising a smoke outlet, wherein the apparatus comprises an air inlet device connected to the smoke outlet, the air inlet device comprising:
 a first wall extending from and out of the smoke outlet of the roasting apparatus to the smoke inlet, and
 at least one hole through the wall.

* * * * *